United States Patent
Shibayama et al.

(10) Patent No.: US 10,245,920 B2
(45) Date of Patent: Apr. 2, 2019

(54) VEHICLE AIR CONDITIONING DEVICE

(71) Applicant: HONDA MOTOR CO., LTD., Tokyo (JP)

(72) Inventors: Ayana Shibayama, Wako (JP); Ryuichi Fukuyama, Wako (JP); Motohiro Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/668,018

(22) Filed: Aug. 3, 2017

(65) Prior Publication Data
US 2018/0037084 A1    Feb. 8, 2018

(30) Foreign Application Priority Data
Aug. 5, 2016    (JP) ................ 2016-154695

(51) Int. Cl.
*B60H 1/00*    (2006.01)
*B60H 1/24*    (2006.01)

(52) U.S. Cl.
CPC ..... *B60H 1/00564* (2013.01); *B60H 1/00028* (2013.01); *B60H 1/00835* (2013.01); *B60H 1/246* (2013.01); *B60H 2001/00185* (2013.01); *B60H 2001/00221* (2013.01)

(58) Field of Classification Search
CPC ............ B60H 1/00564; B60H 1/00835; B60H 2001/00221; B60H 2001/00185
USPC ........................................................ 296/208
See application file for complete search history.

(56) References Cited

U.S. PATENT DOCUMENTS

| | | | | |
|---|---|---|---|---|
| 4,747,636 A * | 5/1988 | Harasaki | ............... | B60R 22/04 280/756 |
| 5,224,748 A * | 7/1993 | Decker | .................. | B60R 5/047 296/37.16 |
| 5,671,968 A * | 9/1997 | Masuda | ............... | B62D 21/157 296/187.12 |
| 6,068,046 A * | 5/2000 | Pommier | ........... | B60H 1/00207 165/41 |
| 6,318,796 B1 * | 11/2001 | Felsen | .................. | B60H 1/0055 296/208 |
| 6,383,599 B1 * | 5/2002 | Bell | ......................... | B32B 5/18 296/208 |
| 6,537,641 B1 * | 3/2003 | Kroll | ..................... | B60N 3/046 296/208 |
| 7,396,062 B2 * | 7/2008 | Hung | ................. | B60H 1/00564 296/24.34 |
| 7,434,871 B2 * | 10/2008 | Mizuma | ................ | B60N 2/015 296/193.07 |
| 7,641,266 B2 * | 1/2010 | Platto | .................. | B60H 1/0055 296/193.06 |
| 7,654,099 B2 * | 2/2010 | Mizutani | ............ | B60H 1/00564 181/224 |

(Continued)

FOREIGN PATENT DOCUMENTS

JP    2009-196519 A    9/2009

*Primary Examiner* — Pinel E Romain
(74) *Attorney, Agent, or Firm* — Rankin, Hill & Clark LLP

(57) ABSTRACT

A vehicle air conditioning device including a duct for supplying conditioned air from an air conditioner to occupants, in which the air conditioner executes heating, ventilation, and air conditioning (HVAC) in a vehicle compartment; and the duct is extended in a vehicle rear direction and is fixed to a floor carpet is provided.

7 Claims, 5 Drawing Sheets

(56) References Cited

U.S. PATENT DOCUMENTS 8,714,636 B2 * 5/2014 Wanke ............... B62D 25/2018
296/203.02

* cited by examiner

VEHICLE AIR CONDITIONING DEVICE

FIELD OF THE INVENTION

The present invention relates to a vehicle air conditioning device for an automobile, etc.

RELATED ART

A prior art for supplying conditioned air to a wheelchair occupant in a rear portion of a vehicle is described in Patent Literature 1. Patent Literature 1 discloses an air conditioning passage having an air intake for supplying air from an outside to a body portion of a wheelchair, a nozzle which opens toward a wheelchair occupant, and an air guide passage through which an air supply device of an air conditioning equipment is connected to the air intake of an air conditioning passage.

PRIOR ART DOCUMENT

Patent Literature

Patent Literature 1: JP 2009-196519 A

SUMMARY OF THE INVENTION

Problems to be Solved

As described in Patent Literature 1, in a wheelchair accessible vehicle in which an air guide passage is placed on a floor of the vehicle, it is preferable to attach the air guide passage without changing the layout around the floor because common use with vehicles which are not compatible with wheelchairs can be achieved.

The present invention has been made to solve the above problem. An object of the present invention is to provide a vehicle air conditioning device which is easily attached to a floor of a vehicle with a simple layout design around the floor.

Means for Solving the Problems

In order to achieve the above object, the present invention provides a vehicle air conditioning device including a duct for supplying conditioned air from an air conditioner to occupants, in which the air conditioner executes heating, ventilation, and air conditioning (HVAC) in a vehicle compartment; and the duct is extended in a vehicle rear direction and is fixed to a floor carpet.

According to the present invention, the vehicle air conditioning device is easily attached to the vehicle floor by fixing the duct to the floor carpet, and the layout design around the floor can be simplified.

According to the present invention, the duct is fixed to the floor carpet by a belt.

According to the present invention, the duct can be fixed to the floor carpet by simple work.

According to the present invention, the duct is covered by a cover.

According to the present invention, an appearance around the floor is improved because the duct is hidden, and a surface of the duct is prevented from being scratched by the cover.

According to the present invention, the duct includes an air flow path frame portion having a closed section; and a pair of left and right reinforcing frame portions, wherein the air flow path frame portion forms a flow channel for the conditioned air; and the pair of left and right reinforcing frame portions are formed on both sides of the air flow path frame portion in a vehicle width direction, and each of the reinforcing frame portions includes an oblique side wall and a reinforcing member for supporting an inner surface of the oblique side wall, wherein the oblique side wall extends from the air flow path frame portion toward lower outside in the vehicle width direction.

According to the present invention, a side surface portion of the duct can be prevented from being hit by the occupant's toe by the reinforcing frame portion, and the conditioned air can be supplied through the air flow path frame portion without fail. The occupant is prevented from stumbling by the oblique side wall. The reinforcing member supports the oblique side wall. When the occupant steps on the oblique side wall, the reinforcing member can suppress subsiding of the oblique side wall.

According to the present invention, the reinforcing member is freely bent via a thin hinge portion at a lower end of the oblique side wall.

According to the present invention, the reinforcing member can be molded easily.

According to the present invention, the reinforcing member includes a wall supporting portion which abuts against an inner surface of the oblique side wall, and a fixing portion which abuts against and is fixed to a lower frame of the air flow path frame portion.

According to the present invention, the reinforcing member can be attached simply and rapidly.

According to the present invention, a boss protrudes upwardly from the lower frame of the air flow path frame portion so as to suppress subsiding of the upper frame of the air flow path frame portion.

According to the present invention, the boss can suppress subsiding of the upper plate when the occupant steps on the upper plate.

Effect of the Invention

According to the present invention, a vehicle air conditioning device can be easily attached to the floor of the vehicle, and the layout design around the floor can be simplified.

EMBODIMENTS FOR CARRYING OUT THE INVENTION

Hereinafter, a vehicle air conditioning device for supplying conditioned air to a wheelchair occupant in a vehicle will be explained. In the vehicle, front seats are provided at a first row, rear seats are provided at a second row, and a wheelchair occupant occupies at a center of a third row in a vehicle width direction.

Figure 1:
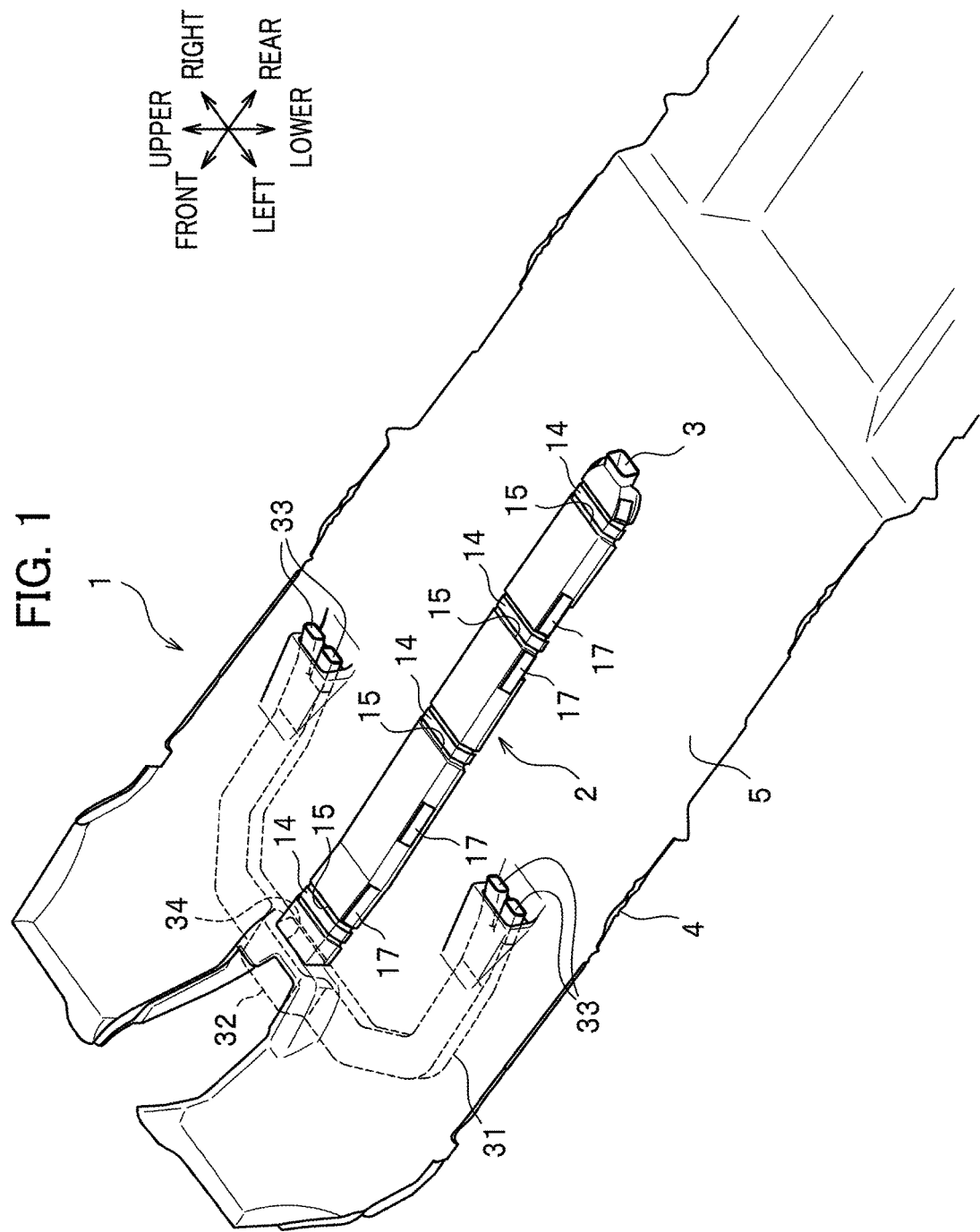
FIG. 1 is a perspective view of a vehicle air conditioning device according to one embodiment of the present invention (a cover is not shown)
Figure 4:
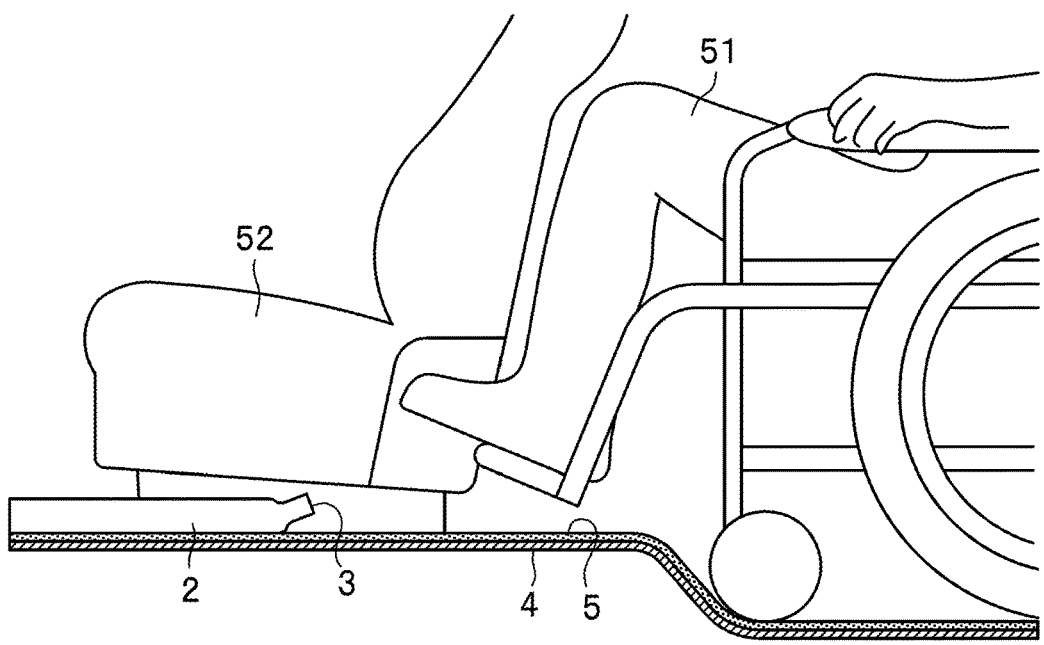
FIG. 4 is a side view of the duct around a rear end portion.

As shown in FIG. 1, vehicle air conditioning device 1 of the present invention is provided with a duct 2 for supplying the conditioned air from an air conditioner (not shown), which executes heating, ventilation, and air conditioning (HVAC) in a vehicle compartment, to a wheelchair occupant 51 (see FIG. 4). The duct 2 extends in a vehicle front-rear direction at a center of a vehicle width direction. A front end of the duct 2 is connected to a duct 31 for supplying conditioned air to an occupant on a rear seat 52 in the second row (see FIG. 4). As shown in FIG. 4, a rear end (i.e., a nozzle 3) of the duct 2 is placed under the rear seat 52 so as to supply the conditioned air. A floor carpet 5 is placed on a floorboard 4 which is made of a steel sheet, etc. The duct 2 is placed on an upper surface of the floor carpet 5, and fixed to the floor carpet 5.

The duct 31 has left and right flow channels extended in a rear direction from a front connecting portion 32 connected to the air conditioner placed in front of the vehicle compartment. The duct 31 has a U-shape in a plan view. Although the duct 2 is fixed to the floor carpet 5, the duct 31 is fixed to the floorboard 4 and is covered by the floor carpet 5. Left and right nozzles 33 of the duct 31 are placed under the front seat, and proceed into the vehicle compartment via notches formed through the floor carpet 5. A rear connecting portion 34, which is connected to a front end of the duct 2, is formed at the rear side of the front connecting portion 32 of the duct 31.

Figure 2:
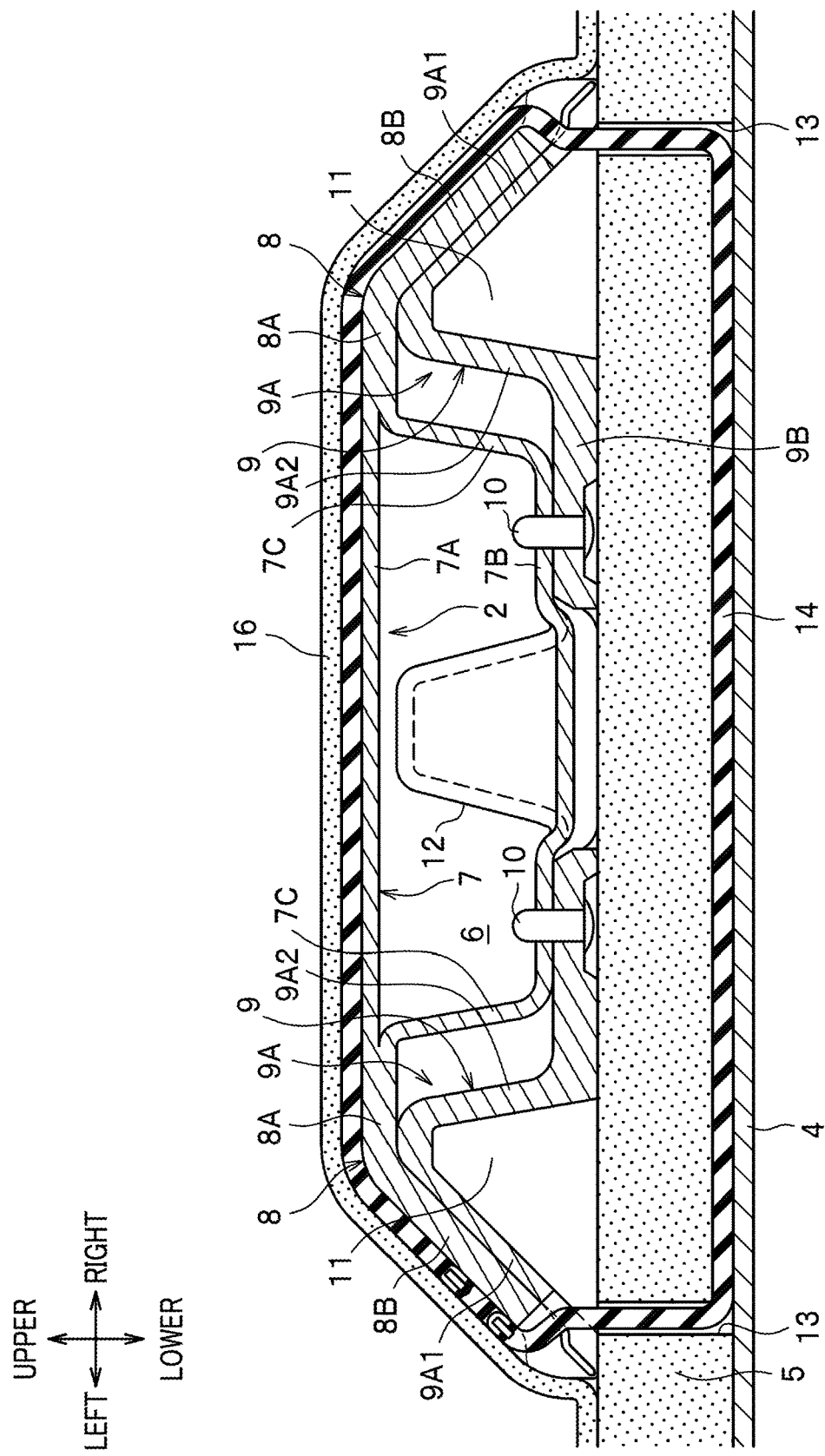
FIG. 2 is a sectional view of the vehicle air conditioning device according to the embodiment of the present invention.

As shown in FIG. 2, the duct 2 includes a air flow path frame portion 7 having a closed section; and a pair of left and right reinforcing frame portions 8, wherein the air flow path frame portion 7 forms a flow channel 6 for the conditioned air; and the pair of left and right reinforcing frame portions 8 are formed on both sides of the air flow path frame portion 7 in a vehicle width direction. The duct 2 is made of a resinous material, etc. The air flow path frame portion 7 includes horizontal upper and lower plates 7A, 7B which extend in the vehicle front-rear direction, and a pair of left and right side plates 7C, 7C, and has an oblate rectangular cross-section. Left and right ends of the upper plate 7A extend in the vehicle width direction, and are coplanar with the upper plates 8A, 8A. The reinforcing frame portion 8 includes the upper plate 8A, an oblique side wall 8B which extends from an end of the upper plate 8A (i.e., from the air flow path frame portion 7) toward lower outside in a vehicle width direction, and a reinforcing member 9 for supporting an inner surface 8C of the oblique side wall 8B. The oblique side wall 8B is formed for preventing stumble, etc.

Figure 3:
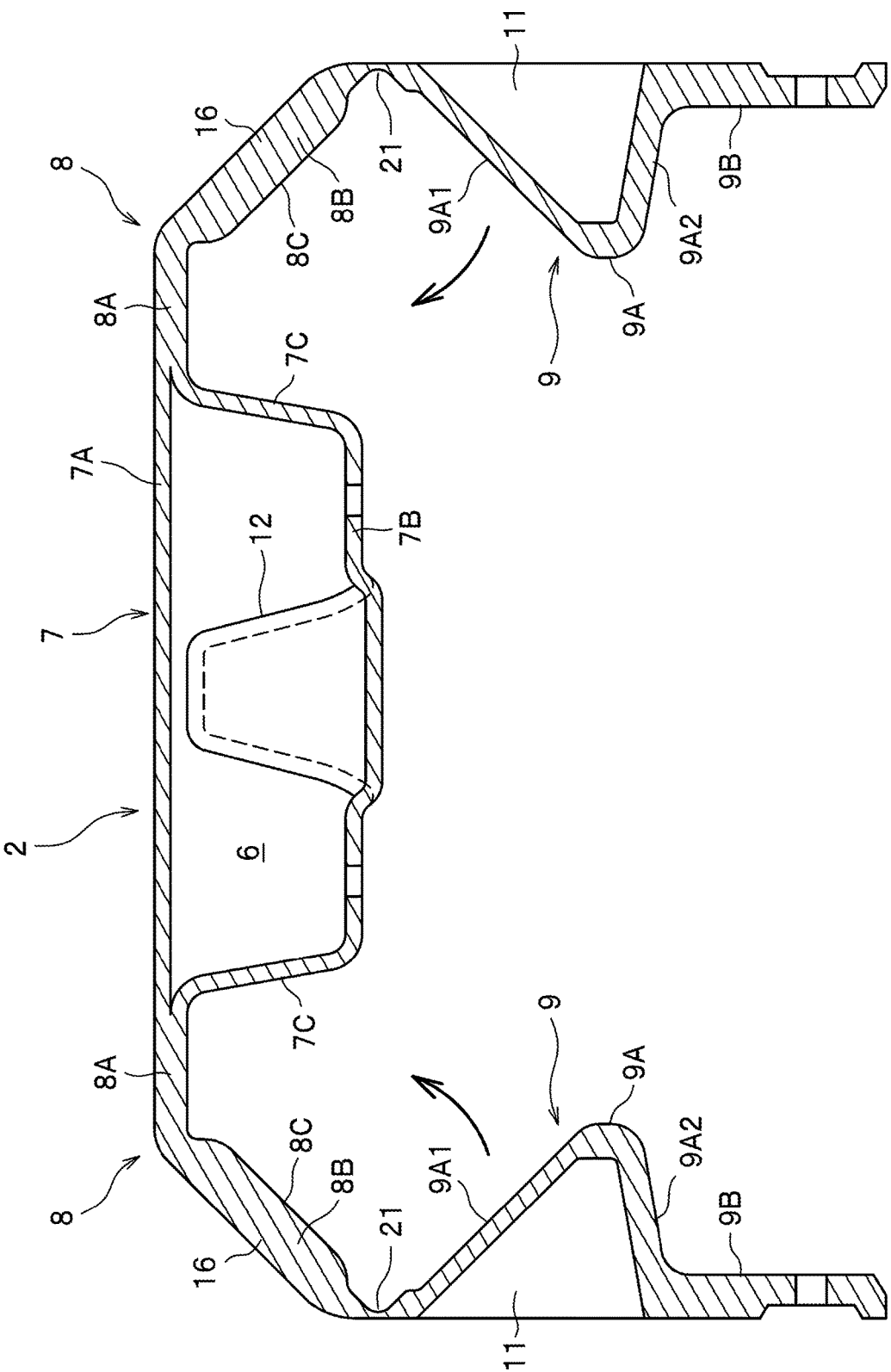
FIG. 3 is a sectional view of a duct (not folded) at a hinge portion.

As shown in FIG. 3, the reinforcing member 9 is freely bent via a thin hinge portion 21 at a lower end of the oblique side wall 8B. The reinforcing member 9 is formed along the full extent of the duct 2. In FIGS. 2 and 3, the reinforcing member 9 includes a wall supporting portion 9A which abuts against an inner surface 8C of the oblique side wall 8B, and a fixing portion 9B which abuts against and is fixed to a lower frame (i.e., a lower plate 7B) of the air flow path frame portion 7. The wall supporting portion 9A is a plate member having a U-shaped cross section. As shown in FIG. 2, an oblique plate portion 9A1 abuts against the inner surface 8C of the oblique side wall 8B, and a top of the oblique plate portion 9A1 abuts against a lower surface of the upper plate 8A. The fixing portion 9B extends from a lower end of an oblique plate 9A2 toward inside in the vehicle width direction, and reaches the lower plate 7B of the air flow path frame portion 7 to be fixed by a screw member 10 which is inserted from below. A plurality of reinforcing plate ribs 11 are formed along the vehicle width direction between the oblique plate portion 9A1 and the oblique plate 9A2. The reinforcing plate ribs 11 are placed at intervals in the vehicle front-rear direction.

A boss 12 is formed at the lower plate 7B of the air flow path frame portion 7. The boss 12 protrudes upwardly so as to suppress subsiding of the upper frame (i.e., the upper plate 7A). The boss 12 has a hollow truncated cone shape with a lower end opening. A clearance is provided between an upper surface of the boss 12 and the upper plate 7A. A plurality of bosses 12 are placed at intervals in the vehicle front-rear direction.

As shown in FIG. 2, the duct 2 having the above closed section is fixed to the floor carpet 5 by a belt 14. The belt 14 is, for example, a rubber belt. Slits 13 are formed through the floor carpet 5 corresponding to both ends of the duct 2. One end of the belt 14 passes through the slits 13, passes over a lower surface of the floor carpet 5, the upper plate 7A of the duct 2, the upper plates 8A, 8A, and the oblique side walls 8B, 8B, and is fastened to the other end of the belt 14. As shown in FIG. 1, a concave groove 15 is formed on the upper plate 7A of the duct 2, the upper plates 8A, 8A, and the oblique side walls 8B, 8B so as to receive the belt 14. As shown in FIG. 1, pluralities of portions which are fixed by the belts 14 are placed at intervals in the vehicle front-rear direction.

Figure 5:
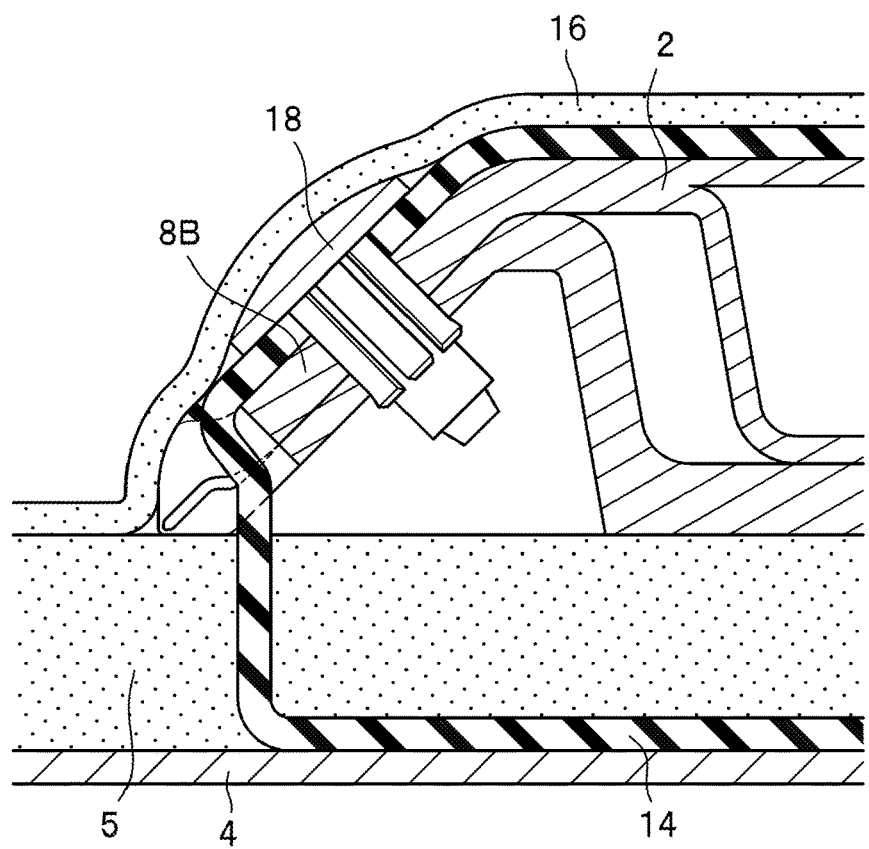
FIG. 5 is a sectional view of a modified embodiment of a cover attached to the duct.

The duct 2 fixed to the floor carpet 5 is covered by a cover 16. If the cover 16 is made of the same or like material as that of the floor carpet 5, uncomfortable feeling caused by providing a convex portion of the duct 2 on the floor can be suppressed. The floor carpet 5 is a thick member because the floor carpet 5 has a soundproofing function, etc. Because the cover 16 merely covers the duct 2, the cover 16 may be a relatively thin member whose surface is made of the same material as that of the floor carpet 5. As shown in FIG. 1, a hook and loop fastener 17 is attached to the oblique side wall 8B of the duct 2 at intervals in the vehicle front-rear direction. The cover 16 is fixed by the hook and loop fastener 17 so as to cover the duct 2. As shown in FIG. 5, the cover 16 may be fixed by engaging a clip 18 attached to the lower surface of the cover 16 with a clip hole provided at the oblique side wall 8B.

Figure 6:
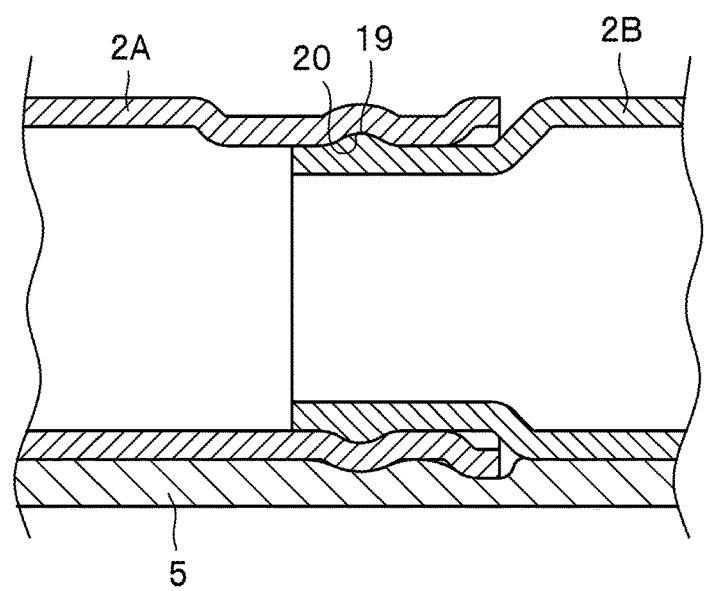
FIG. 6 is a sectional view of a connected configuration between front and rear ducts.

The duct 2 may be divided in the vehicle front-rear direction. As shown in FIG. 6, for example, a front duct 2A and a rear duct 2A may be connected by inserting a convex portion 19 into a concave portion 20.

Figure 7:
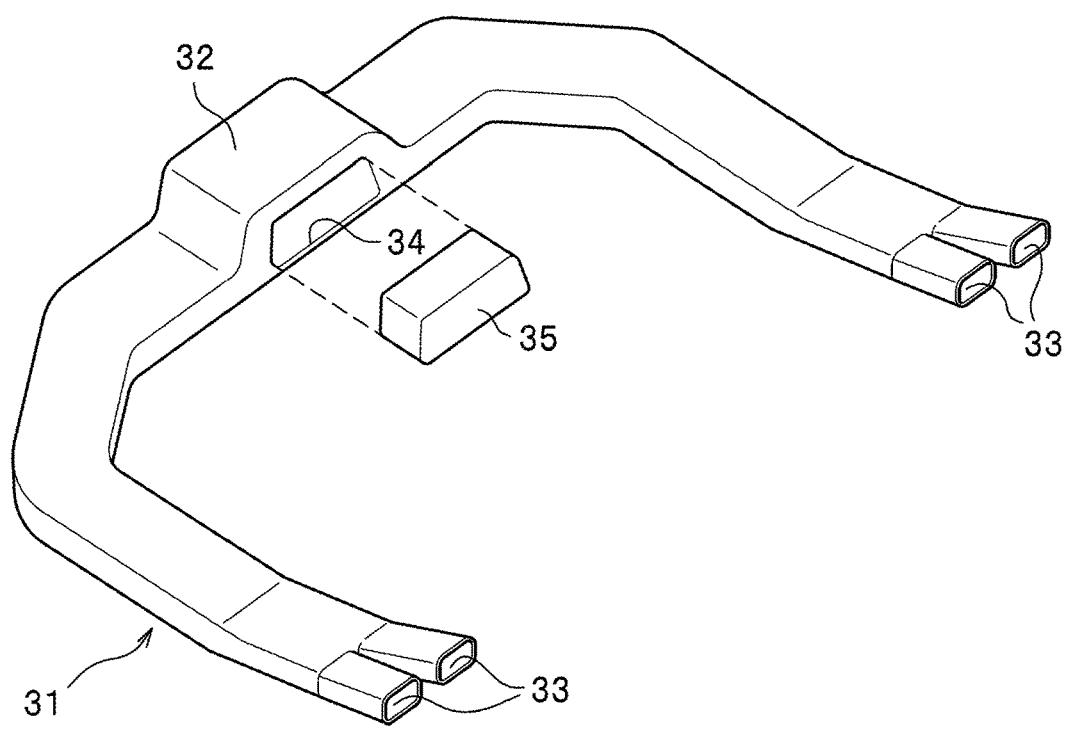
FIG. 7 is a perspective view of a duct for a rear seat.

As described above, the duct 2 can be easily attached to the floor carpet 5 by extending the duct 2 in the vehicle rear direction and fixing the duct 2 to the floor carpet 5. Particularly, the floorboard 4 and the floor carpet 5 can be shared among the vehicles which are not compatible with wheelchairs (i.e., which are not required to supply conditioned air to an occupant at a third row), and the layout design around the duct 2 can be simplified. As shown in FIG. 7, the duct 31 for the rear seat can be shared among the vehicles which are provided with only ducts 31 for the rear seats by filling the rear connecting portion 34 with a sealing member 35.

When the duct 2 is fixed to the floor carpet 5 by the belt 14, the duct 2 is fixed to the floor carpet 5 without fail by simple work. In addition, the appearance around the floor is improved because the duct 2 is hidden, and a surface of the duct 2 can be prevented from being scratched by the cover 16.

The duct 2 includes the air flow path frame portion 7, and the pair of left and right reinforcing frame portions 8 formed on both sides of the air flow path frame portion 7. Each of the reinforcing frame portions 8 includes the oblique side wall 8B which extends from the air flow path frame portion 7 toward lower outside in the vehicle width direction, and the reinforcing member 9 for supporting the inner surface 8C of the oblique side wall 8B. According to this configuration, a side surface portion of the duct 2 can be prevented from being hit by the occupant's toe by the reinforcing frame portion 8, and the conditioned air can be supplied through the air flow path frame portion 7 without fail. The occupant is prevented from stumbling by the oblique side wall 8B. The reinforcing member 9 supports the oblique side wall 8B. When the occupant steps on the oblique side wall 8B, the reinforcing member 9 can suppress subsiding of the oblique side wall 8B.

The reinforcing member 9 is freely bent via the thin hinge portion 21 at a lower end of the oblique side wall 8B. If the reinforcing member 9 is made of a resinous material, the reinforcing member 9 can be molded easily by a metal mold, etc. The reinforcing member 9 includes the wall supporting portion 9A which abuts against the inner surface 8C of the oblique side wall 8B, and the fixing portion 9B which abuts against and is fixed to the lower plate 7B of the air flow path frame portion 7. The reinforcing member 9 can be attached simply and rapidly.

The boss 12 protrudes upwardly from the lower plate 7B of the air flow path frame portion 7 so as to suppress subsiding of the upper plate 7A of the air flow path frame portion 7. When the occupant steps on the upper plate 7A, the boss 12 can suppress subsiding of the upper plate 7A.

While a preferred embodiment has been described, variations thereto will occur to those skilled in the art within the scope of the present invention. For example, the belt 14 may be made of a nonelastic material. The fixing portion 9B of the reinforcing member 9 may be fixed to the lower plate 7B of the air flow path frame portion 7 by inserting a convex portion into a concave portion.

REFERENCE SIGNS LIST

1: vehicle air conditioning device
2: duct
3: nozzle
4: floorboard
5: floor carpet
7: air flow path frame portion
8: reinforcing frame portion
8B: oblique side wall
8C: inner surface
9: reinforcing member
9A: wall supporting portion
9B: fixing portion
11: rib
12: boss
14: belt
16: cover
17: hook and loop fastener
21: hinge portion
31: duct for rear seat

What is claimed is:

1. A vehicle air conditioning device, comprising a duct for supplying conditioned air from an air conditioner to occupants of a wheelchair accessible vehicle, wherein
   the air conditioner executes heating, ventilation, and air conditioning in a vehicle compartment of the vehicle,
   the duct is extended in a vehicle rear direction and is placed on an upper surface of a floor carpet and fixed to the floor carpet, and the duct supplies conditioned air from the air conditioner to a portion of the vehicle compartment configured to hold a wheelchair occupant in a wheelchair.

2. The vehicle air conditioning device according to claim 1, wherein the duct is fixed to the floor carpet by a belt.

3. The vehicle air conditioning device according to claim 1, wherein the duct is covered by a cover.

4. The vehicle air conditioning device according to claim 1, wherein
   the duct includes an air flow path frame portion having a closed section; and a pair of left and right reinforcing frame portions, wherein the air flow path frame portion forms a flow channel for the conditioned air; and the pair of left and right reinforcing frame portions are formed on both sides of the air flow path frame portion in a vehicle width direction, and
   each of the reinforcing frame portions includes an oblique side wall and a reinforcing member for supporting an inner surface of the oblique side wall, wherein the oblique side wall extends from the air flow path frame portion toward lower outside in the vehicle width direction.

5. The vehicle air conditioning device according to claim 4, wherein the reinforcing member is freely bent via a thin hinge portion at a lower end of the oblique side wall.

6. The vehicle air conditioning device according to claim 5, wherein the reinforcing member includes a wall supporting portion which abuts against an inner surface of the oblique side wall, and a fixing portion which abuts against and is fixed to a lower frame of the air flow path frame portion.

7. The vehicle air conditioning device according to claim 4, wherein a boss protrudes upwardly from the lower frame of the air flow path frame portion so as to suppress subsiding of the upper frame of the air flow path frame portion.

* * * * *